Figure 1:
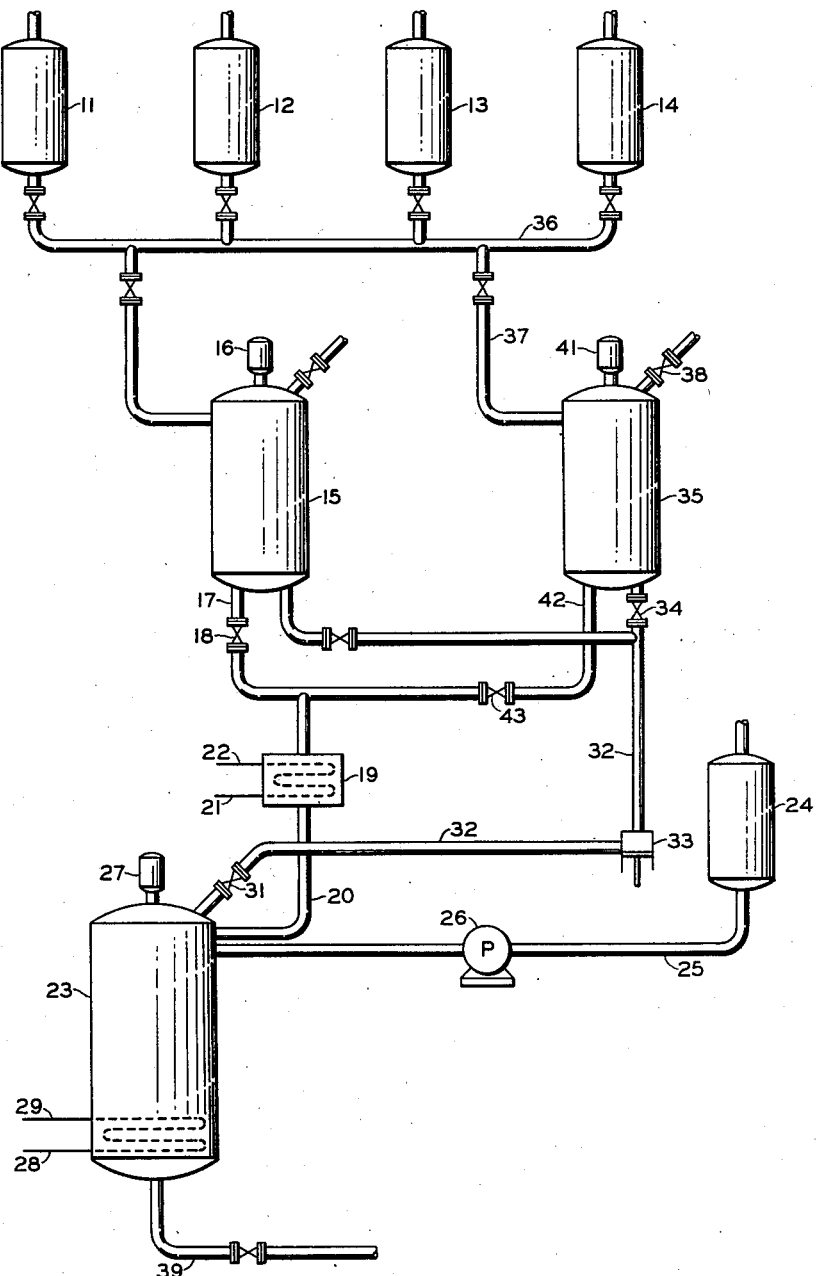

INVENTOR.
W. W. CROUCH

Patented July 8, 1952

2,602,787

UNITED STATES PATENT OFFICE 2,602,787

EMULSION COPOLYMERIZATION OF SULFUR DIOXIDE AND UNSATURATED ORGANIC COMPOUNDS WITH RECOVERY OF UNCONTAMINATED UNREACTED SULFUR DIOXIDE

Willie W. Crouch, Bartlesville, Okla., assignor to Phillips Petroleum Company, a corporation of Delaware Application July 29, 1949, Serial No. 107,596

10 Claims. (Cl. 260—79.3)

This invention relates to the production of synthetic resinous materials formed by reaction between sulfur dioxide and one or more unsaturated organic compounds. In one of its more specific aspects it relates to the recovery of uncontaminated unreacted sulfur dioxide from a system for reacting sulfur dioxide and unsaturated organic compounds for reuse in that system.

It has been well known for a number of years that sulfur dioxide will react with numerous unsaturated organic materials to form heteropolymeric resinous products. Apparently the resin is produced from equimolar quantities of sulfur dioxide and the unsaturated organic material. The reaction appears to take place only in the liquid phase and it will proceed in the absence of catalysts only in the presence of actinic light, or it will proceed in the presence of any one of a large number of catalytic materials, most of which appear to have oxidizing properties, in the dark or in the light. Some of the more important catalysts for promoting this reaction are oxygen, hydrogen peroxide, ozone, various nitrates such as silver and lithium nitrates, nitrites, persulfates, chlorates, perchlorates, ascaridole, ozonized olefins, etc. Organic compounds which enter into the formation of such resins include mono-olefins, cyclo-olefins, substituted aliphatic olefins such as styrene, diolefins such as butadiene, isoprene, cyclohexadiene, and the like, acetylenes and polyfunctional unsaturated compounds such as allyl alcohol, vinyl acetate, allyl ethyl ether, o-allylanisole, o-allylphenol, p-bromoallylbenzene, methyl undecylenate, undecylenyl alcohol, undecylenic acid, etc. When mixtures of such unsaturated organic compounds are used, the resulting resin appears to have been formed by a copolymerization of the unsaturated compounds with sulfur dioxide since its properties do not correspond to blends of resins produced from the individual unsaturated organic compounds and often have properties which are superior to any one of the resins produced from the individual unsaturated compounds. For many of the unsaturated compounds there appears to be a "ceiling temperature" above which the reaction does not take place, and in such instances it is necessary to conduct the resin-forming reaction at a temperature below the ceiling temperature and, when forming the resin from a mixture or organic unsaturated compounds, it appears desirable to conduct the reaction at a temperature below the ceiling temperature of the material having the lowest ceiling temperature. The resin-forming reaction is somewhat exothermic and generally some provision must be made for removing the heat of reaction. All of these features are more fully described in the literature.

The resins heretofore produced have generally been formed in the presence of only a moderate excess of sulfur dioxide and have been recovered as solid materials possessing a horn-like appearance or having a porous expanded form. These materials are tough and difficult to handle. In order to secure successful commercial products it has been necessary to grind these mechanically in order to form a finely divided material, thus facilitating removal of occluded impurities. Even when ground to a fine powder, it has often been difficult to remove completely all of the occluded impurities, such as uncombined reactants and other materials either present in the reactants as charged to the process or introduced in processing and handling the resin. In some instances it appears that the grinding procedure results in the introduction of minute quantities of metallic impurities which affect the clarity and general appearance of the molded products. Further, the grinding procedure develops undesirable heat which tends to soften the resin and cause the ground particles of resin to fuse, thus increasing the difficulty of the removal of impurities and in some instances resulting in an unsatisfactory molding powder because of particle size. Also, even if the grinding operation results in a satisfactory, fine powder, the removal of occluded impurities is difficult and expensive.

A method, of which I am one of the inventors, has now been found and, as is disclosed in application Serial No. 8,755, filed February 16, 1948, by Crouch and Cotten, whereby unsaturated organic compounds and sulfur dioxide are caused to react to produce resinous products of varied properties and wide adaptability, said products are readily freed from unreacted reactants and other impurities. The process comprises reacting the unsaturated compound and sulfur dioxide in aqueous emulsion in the presence of suitable catalysts and emulsifying agents. When the reaction is carried out in aqueous emulsion the materials remain in a fluid condition and can be agitated readily, thus maintaining adequate contact of the reactants at all stages of the conversion. Sulfur dioxide is maintained in the reaction system in an amount stoichiometrically in excess of the unsaturated compound. The unsaturated material employed in the polymerization with sulfur dioxide often contains small amounts of inert gaseous hydrocarbons, such as butanes, with which butene monomers are often contaminated. When employing conventional procedures for the recovery of the unreacted sulfur dioxide these inert hydrocarbons tend to remain in the sulfur dioxide. Employment of the recovered sulfur dioxide in a subsequent reaction of sulfur dioxide and unsaturated organic material results in an undesirable accumulation of the inert hydrocarbons in the system.

An object of this invention is to react sulfur dioxide and an unsaturated organic compound to form a heteropolymeric resin. Another object of the invention is to recover uncontaminated, unreacted sulfur dioxide from the reaction of sulfur dioxide and an unsaturated organic compound for reuse in a subsequent reaction. Another object of the invention is to effect production from sulfur dioxide and an olefinic material of a resin in a finely divided form by means of an improved batch-type operation. Another object of the invention is to effect a continuous production from sulfur dioxide and an olefinic material of a resin in a finely divided form. Other and further objects and advantages of this invention will be apparent to those skilled in the art upon study of the accompanying disclosure and discussion.

The production of materials of the polymeric type in aqueous emulsion is well known. Emulsion polymerization methods are particularly important and are widely used in the manufacture of synthetic rubber, and the like. Usually, however, the monomers employed in these processes are compounds such as butadiene, isoprene, chloroprene, methyl acrylate, methyl methacrylate, acrylonitrile, styrene, and the like. These monomers are chemically neutral, that is, they have neither strongly acidic nor basic properties. Furthermore, most of them have little or no solubility in water so that when they are used in emulsion polymerization processes they form a water-insoluble phase which contains substantially all of the monomers. These compounds are also non-electrolytes, that is, any part of the material that enters the water phase is not ionized and therefore does not interfere with the action of the emulsifying agent.

In contrast to the above mentioned monomers, sulfur dioxide is highly soluble in water and reacts with water to form an electrolyte, sulfurous acid, which has pronounced acidic properties. In the emulsion copolymerization of sulfur dioxide with unsaturated compounds, the sulfur dioxide is divided between the aqueous and nonaqueous phases but a substantial portion of it remains in the aqueous phase which, as hereinbefore mentioned, is quite acidic. The usual emulsifying agents employed for carrying out polymerization reactions are not applicable in the presence of sulfur dioxide. In fact, the addition of an acidic electrolyte such as sulfurous acid to a resin or rubber latex prepared in the usual way is known to be an effective means of coagulating the latex and agglomerating the polymer. Thus it is entirely unobvious and unpredictable to one skilled in the art that emulsion polymerization methods can be applied to the production of copolymers in which sulfur dioxide is employed as a monomer.

It has now been found that satisfactory emulsion polymerization systems may be provided for the interaction of unsaturated organic compounds and sulfur dioxide through the use of selected emulsifying agents which are effective at low pH. Thus, while emulsifiers such as fatty-acid soaps are inapplicable since they react with sulfurous acid, other emulsifiers which are salts of strong acids may be used, for example, salts of sulfonic acids. These latter compounds are more strongly acidic than sulfurous acid. Surface active salts of organic amines are also applicable.

Figure 2:
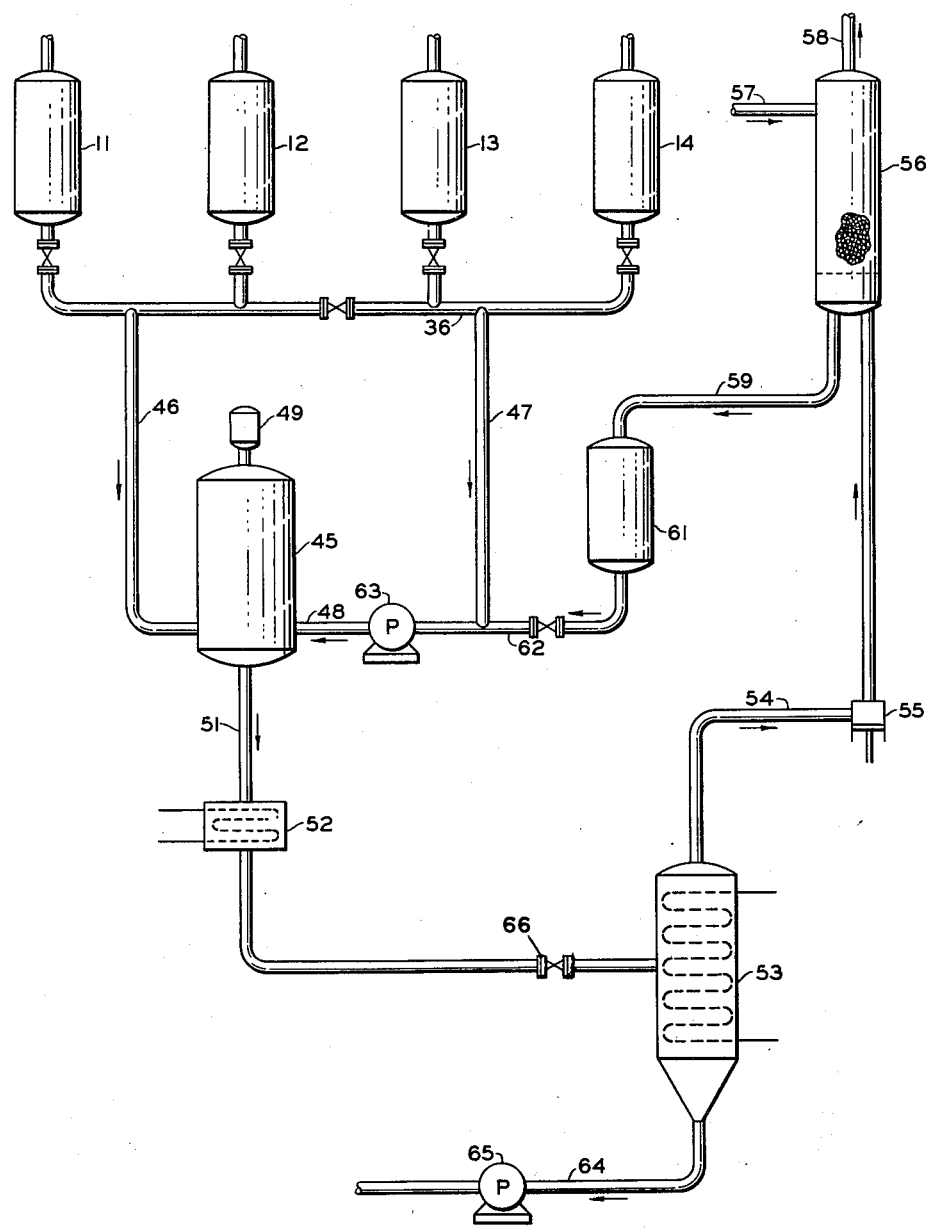

Figure 1 of the drawings is a schematic flow plan utilized in the preferred modification of this invention. Figure 2 is a schematic flow plan of a modification of this invention.

Referring particularly to Figure 1 of the drawings, in a general embodiment of the invention, a mono-olefin from chamber 11, sulfur dioxide from chamber 12, water and an emulsification agent, which is active in an acid medium, from chamber 13, and a catalyst, such as lithium nitrate, from chamber 14 are supplied to a first reactor chamber 15. The sulfur dioxide is readily dissolved in the water and an aqueous solution of sulfur dioxide is formed within reactor 15. The materials are mixed within reactor 15 by means of mixer 16 so as to form an emulsion of the mono-olefin with the aqueous sulfur dioxide solution as an oil-in-water type emulsion. Substantially equimolar quantities of the mono-olefinic material and sulfur dioxide are reacted in reactor chamber 15 to form a heteropolymer. The heteropolymer-containing emulsion is removed from the lower portion of reactor chamber 15 through conduit 17 and valve 18 and is passed through heater 19 wherein the temperature of the heteropolymer-containing emulsion is raised to a temperature within the range of from 140° F. to 185° F. Heater 19, as is diagrammatically shown in the drawings, is a coil-type heater and hot heat exchange material is passed through the heater by means of conduits 21 and 22. Any conventional heater may be utilized for the purpose of heating the emulsion material. Better operation is obtained if the emulsion material is heated in heater 19 to a temperature within the range of between 150° F. and 180° F. The heated emulsion material is passed by way of conduit 20 into a coagulator chamber 23. A coagulant is passed from chamber 24 by way of conduit 25 and pump 26 into coagulator chamber 23. The coagulant and the heteropolymer-containing emulsion are intimately contacted by stirring with mixer 27. The temperature of the material is maintained by passing a heat exchange medium through the lower portion of the coagulator chamber by means of conduits 28 and 29.

Unreacted vaporized materials are removed from the emulsion material in coagulator chamber 23, preferably before the addition of the coagulant, and are removed therefrom through valve 31 and conduit 32, preferably at diminished pressure (e. g., between 0.1 and 1 atmosphere), to compressor 33. The gaseous materials are compressed in compressor 33 and are passed by means of a continuation of conduit 32 and valve 34 into the lower portion of reactor chamber 35. Water and an emulsification agent from chamber 13 and catalyst from chamber 14 which have previously been supplied to the reactor 35 through conduits 36 and 37 form a liquid filter for the gaseous materials entering the lower portion of reactor 35. Sulfur dioxide, being soluble in the water, is dissolved therein and other unreacted materials, such as other monomeric materials, saturated hydrocarbons or air, which are insoluble in water at operating conditions pass through the liquid in reactor 35 and are removed from the upper portion of reactor 35 through valve 38.

After removal of the unreacted materials from chamber 23, the heteropolymer, which is primarily in the form of a latex, is in condition for coagulation. The amount of the coagulant which is added to coagulator 23 prior to the removal of the unreacted materials, if any, is ordinarily quite small. After removal of the unreacted materials, sufficient coagulant is supplied to coagulator 23 to substantially break down the emulsion, coagulate the resin, and agglomerate the latex therein. The slurry of coagulum is then removed from the lower portion of coagulator 23 by means of conduit 39 for further processing. Mono-olefin from chamber 11 and additional sulfur dioxide from chamber 12 is added to the aqueous solution in reactor 35 in such an amount that the sulfur dioxide therein is in an amount stoichiometrically in excess of the mono-olefin. The mono-olefin is emulsified in the aqueous sulfur dioxide solution by stirring with stirrer 41. The reaction between the mono-olefin and the sulfur dioxide takes place within reactor 35 in the manner described in connection with reactor 15. After the coagulum has been removed from coagulator 23 the emulsion is removed from the lower portion of reactor 35 through conduit 42 and valve 43 and is passed through heater 19 as described hereinabove. Another batch reaction is then started in reactor 15 in the same manner as described in connection with reactor 35.

In the modification shown as Figure 2 of the drawings, water and an emulsification agent from chamber 13, a polymerization catalyst from chamber 14, sulfur dioxide from chamber 12, and a mono-olefinic material from chamber 11 are continuously supplied to reactor 45 through conduits 36, 46, 47, and 48. The sulfur dioxide is dissolved in the water and forms an aqueous solution for the purpose of emulsifying the mono-olefinic organic material. The materials are mixed within reactor 45 by means of stirrer 49 so as to form an emulsion of the mono-olefinic material in the aqueous solution of sulfur dioxide as an oil-in-water type emulsion. The amount of sulfur dioxide which is maintained in reactor 45 is stoichiometrically in excess of the mono-olefinic organic material. The mono-olefinic organic material and the sulfur dioxide reacted in reactor 45 are removed with the emulsion from the lower portion thereof through conduit 51 and are passed through heater 52 where the temperature of the emulsion is raised to a temperature within the range of between 140° F. and 185° F., preferably between 150° F. and 180° F. The emulsion is passed by a continuation of conduit 51 through throttling valve 66 into flash chamber 53 in which the unreacted materials are flashed from the emulsion at the reduced pressure maintained in the flash chamber and are removed from the upper portion of the flash chamber through conduit 54 through which they are passed to compressor 55. Flash chamber 53 is maintained at diminished pressure (e. g., between 0.1 and 1 atmosphere), which facilitates removal of unreacted materials. The compressed gaseous materials are passed by a continuation of conduit 54 into the lower portion of scrubbing tower 56. Water is introduced into the upper portion of scrubbing tower 56 through conduit 57 and is passed downwardly through suitable packing in the tower countercurrent to the flow of the unreacted materials. Sulfur dioxide is dissolved by the water and water insoluble materials are removed from the upper portion of scrubbing tower 56 through conduit 58. The aqueous solution of sulfur dioxide is removed from the lower portion of scrubbing tower 56 and is passed by means of conduit 59 into surge tank 61. The aqueous solution of sulfur dioxide is passed through conduit 62, through pump 63 in conduit 48, and is supplied by means of conduit 48 as a portion of the aqueous sulfur dioxide for the reaction in reactor 45. The emulsion from which unreacted material has been removed is passed from the lower portion of flash chamber 53 by means of conduit 64 and pump 65 into a coagulation chamber, not shown.

The processes described above have the important advantages of enabling the sulfur dioxide to be recovered by dissolving in water instead of compressing and cooling the gas for storage as liquid sulfur dioxide. Considerable saving is realized for the reason that less compression of the liquid sulfur dioxide is required and less heat removal is needed. Still another advantage is that though liquid sulfur dioxide which is obtained by the recovery of sulfur dioxide and compression thereof in connection with a polymerization of unsaturated organic materials and sulfur dioxide must be fractionated to separate the aforementioned impurities, such as butanes, from the sulfur dioxide, that purpose is economically accomplished by the process of this invention. This is a commercially significant point since for economic reasons it is desirable to employ olefin monomers which have not been highly purified and therefore often contain constituents not reactive with sulfur dioxide.

Separation of the resin is effected by coagulation of the latex, such as with brine-alcohol, brine-acid, solutions of electrolytes, etc., followed by water washing, filtration, and drying of the product. The resinous material thus obtained is a light, soft, fine white powder, its solubility in various solvents depending upon the olefinic material employed. For example, when 1-butene is used, the product is completely soluble in acetone.

The process of this invention not only possesses numerous advantages for the preparation of resins but it also yields stable latices as intermediate products. These latices are produced in the form of emulsions and are extremely valuable for use in various impregnating and coating operations, such as treatment of paper, cloth, and the like, and they may be mixed with other latices, such as a synthetic rubber latex, to produce a variety of materials. Since the latices are stable they can be stored as such for indefinite periods. The resins, obtained by coagulation of the latices, have many advantages over similar resins prepared by methods heretofore employed. The resins are easily recovered from the latices. They may be made to precipitate in the form of a fine-grained powder which can be filtered, dried, and washed free of emulsifier. They are useful as molding powders and are applicable in any of the numerous areas where resinous powders are employed.

Unsaturated organic compounds which are applicable in this invention are those which will react with sulfur dioxide to produce heteropolymeric compounds, under the other conditions heretofore employed by the prior art. Most of such reactants contain an olefinic linkage, and may be represented by the formula

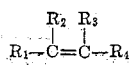

wherein $R_1$ and $R_2$ may be hydrogen, halogen, or alkyl, or $R_1$ may be a constituent of a carbocyclic ring in which $R_4$ is a member, and $R_3$ and $R_4$ may be hydrogen, alkyl, alkenyl, aryl, aralkyl, or have an acetylenic linkage, or substituted groups thereof wherein substituents such as halo, nitro, hydroxyl, carbocyclic, cyano, and the like may be present, or $R_4$ may be a constituent of a carbocyclic ring in which $R_1$ is also a member. In general the olefinic compound employed will not contain more than twenty carbon atoms per molecule. Examples of olefinic compounds which may be used include 1-butene, 2-butene, propylene, isobutylene, pentenes, hexenes, cyclohexene, butadienes, styrene, alpha-methyl styrene, alpha-chloro styrene, vinyl acetylenes, vinyl chloride, vinyl bromide, and the like. It is also frequently desired to employ a mixture of olefinic compounds, rather than a single olefinic compound, in carrying out the process of this invention.

When operating according to the manner herein described, it is generally found that substantially equimolar proportions of olefinic compound and sulfur dioxide react together. In order to facilitate the reaction between the mono-olefinic organic material and sulfur dioxide in an aqueous solution, however, an amount of sulfur dioxide which is stoichiometrically in excess of the unsaturated organic material is used. It is sometimes desired to use a molar excess of sulfur dioxide on the order of 2:1 mol ratio of sulfur dioxide to olefinic material. In other cases it is even more desirable to use a higher ratio, for example, a ratio of 5:1 or greater, depending upon operating conditions, olefinic material employed, the amount of aqueous medium, etc., although it appears that even in such cases equimolar quantities of sulfur dioxide and olefinic compound enter into reaction. Frequently it will be desirable to remove the reactants from the reaction zone, and separate unreacted materials, when between about 70 and about 97 per cent of the reactant present in the lesser amount has reacted. When some diolefins are used as reactants, under some conditions, these materials tend to undergo homopolymerization to form rubber-like products; such reactions are undesired in my invention and conditions should be chosen with such diolefinic reactants, to inhibit such homopolymerization and favor joint interreaction to produce heteropolymeric resins.

Emulsifying agents which are applicable are those which are active in an aqueous medium which has a pH below 7. The aqueous medium in the emulsion used generally has a pH of about 1 to 2, and sometimes has a pH as low as about 0.5. The emulsifying agent used should, of course, be effective at the pH of the aqueous medium in the reaction mixture. Among the compounds which have been found effective are the long chain alkyl sodium sulfates and the branched chain aliphatic or aromatic sodium sulfonates, salts of organic bases such as amine salts, and quaternary ammonium salts. Examples of these materials are lauryl sodium sulfate, diamyl sodium sulfosuccinate, di-secondary-butyl naphthalene sodium sulfonate, dodecylamine hydrochloride, dodecylamine sulfate, and the like. The amount of emulsifying agent employed is that quantity which is necessary to produce a stable emulsion of the ingredients. In some cases an amount as low as about 1 part per 100 parts reactants (olefin plus sulfur dioxide) is considered sufficient and usually an amount not to exceed about 10 parts is added.

Catalysts applicable in this process are the same as those which have been found effective when carrying out the reaction between olefinic compounds and sulfur dioxide by methods heretofore employed. Examples of these catalytic materials include nitrates of the alkali metals and ammonium, nitric acid, potassium persulfate, hydrogen peroxide, organic peroxides, such as cumene hydroperoxide, peracetic acid, and the like. The amount of catalyst used may vary over a wide range and will depend upon the material chosen. In cases where alkali metal nitrates or ammonium nitrate are employed, the amount may vary from 0.03 to 0.60 part per 100 parts reactants with an amount ranging from 0.15 to 0.45 part being generally preferred. With other materials the quantity of catalyst used may be somewhat higher but in any event it is determined by the case at hand.

Temperatures for carrying out the resin-producing reactions of this invention usually fall within the range of from 10° F. to 140° F., and preferably from within the range of 50° F. to 120° F. In some instances, however, it may be deemed advisable to employ temperatures below 10° F. in order to get a more satisfactory reaction. Obviously when polymerizations are carried out in aqueous emulsion in the absence of freezing point depressants, temperatures below the freezing point of the acidic aqueous medium cannot be employed. The use of various additive agents, however, makes a process of the type disclosed herein applicable at lower temperatures. An example of such a low temperature system is a glycerin-water solution, and the term "aqueous emulsion" should be construed to include the use of an aqueous medium comprising water and a sufficient amount of a water-soluble component to lower the freezing point below the desired polymerization temperature, whether or not the actual polymerization temperature is above or below freezing. It is generally preferred that the emulsion be of an "oil-in-water" type, with the ratio of aqueous medium to organic monomeric material between about 1.5:1 and about 10:1, in parts by weight. At low ratios the emulsions tend to have high viscosities and at high ratios the yield per unit volume of reactor per unit of time is low. In the practice of the invention, suitable means will be necessary to establish and maintain an emulsion and to remove reaction heat to maintain a desired reaction temperature. The polymerization may be conducted in batches, semicontinuously, or continuously as discussed above. The total pressure on the reactants is preferably at least as great as the total vapor pressure of the mixture, so that the initial reactants will be present in liquid phase.

Advantages of this invention are illustrated by the following example. The reactants and their proportions and other specific ingredients of the recipe are presented as being typical and should not be construed to limit the invention unduly.

Example

An emulsion polymerization was effected according to the following recipe:

| | Parts by weight |
|---|---|
| 1-butene | 46.7 |
| Sulfur dioxide | 88.3 |
| Water | 180.0 |
| A sodium alkyl benzene sulfonate | [1] 5.0 |
| Lithium nitrate | 0.5 |

[1] Prepared from ($C_{11}$–$C_{14}$) alkyl benzenes.

The polymerization was effected with agitation for four hours at 77° F. Analysis of a sample of the latex formed showed that it contained 41.8 parts of the original 88.3 parts of sulfur dioxide charged to the reactor. A second reactor was charged with the same quantities of water, sodium alkyl benzene sulfonate and lithium nitrate given in the above recipe. The latex was heated to 180° F. and excess sulfur dioxide was vented from the latex to the second reactor and finally was pumped with a compressor from the first reactor to the second reactor. The first reactor, after cooling, had an absolute pressure of about 200 millimeters of mercury at 75° F. The second reactor which contained the recovered sulfur dioxide absorbed in the water therein was analyzed for sulfur dioxide. The analysis showed that 38.7 parts or 92.3 weight per cent of the unreacted sulfur dioxide was recovered in the second reactor.

To the contents of the second reactor were added 46.7 parts 1-butene and enough additional sulfur dioxide to make a total sulfur dioxide content of 88.3 parts. A second reaction was then effected in the same manner as the first. Polymerization proceeded at the same high rate as in the first reaction to yield a similar latex of 1-butene-sulfur dioxide resin.

These data disclose the fact that a very high rate of recovery of uncontaminated, unreacted sulfur dioxide is obtained by the process of this invention. The recovery of the unreacted sulfur dioxide in this manner eliminates the requirement for relatively expensive liquefication and fractionation steps which have heretofore been necessary.

As will be evident to those skilled in the art various modifications of this invention can be made or followed in the light of the foregoing disclosure and discussion without departing from the spirit or scope of the disclosure. Several operating variations will be immediately apparent to those skilled in the art. For instance, in a batch operation the latex need not be removed from the reactor chamber before removal of the excess sulfur dioxide therefrom. It is, however, advantageous to utilize the method which is disclosed for the reason that heating of the latex-containing emulsion facilitates the removal of the gaseous material. It is also within the scope of this invention to dissolve the sulfur dioxide in water before passing it into the reactor chamber. In yet another modification of the invention, it is sometimes desirable during the last phase of stripping the latex under vacuum to introduce live steam or an inert gas into the latex to facilitate removal of the remaining small portion of sulfur dioxide.

I claim:

1. The process of claim 7, wherein additional sulfur dioxide is added to said water from a separate source so as to concentrate sulfur dioxide therein in an amount in molar excess of mono-olefinic organic material with which it is emulsified.

2. The process of claim 7, wherein said unreacted materials are removed from the reaction mixture by heating the emulsion to a temperature within the range of from 140° F. to 185° F. and maintaining said emulsion at a pressure of 0.1 and 1 atmosphere.

3. The process of claim 7, wherein said water is maintained in a reactor zone; removing water insoluble material from said reactor zone; passing a polymerization catalyst and an emulsifying agent which is active in an acid medium into said reactor zone; adding a mono-olefinic organic compound to said reactor zone in an amount stoichiometrically less than that required to react all of said sulfur dioxide dissolved in said water; and emulsifying said mono-olefinic organic material in said aqueous sulfur dioxide solution as an oil-in-water type emulsion.

4. In the process of claim 7, the improvement of passing water downwardly through a scrubbing zone; passing unreacted materials into the lower portion of said scrubbing zone and upwardly therethrough in contact with said downflowing water, whereby sulfur dioxide is dissolved in said water and is separated from water insoluble materials; removing undissolved material from said scrubbing zone; passing the resulting aqueous solution of sulfur dioxide together with a polymerization catalyst and an emulsifying agent which is active in an acid medium into a reaction zone; passing additional sulfur dioxide and said mono-olefinic organic material into said reaction zone in amounts such that sulfur dioxide therein is in molar excess of said mono-olefinic organic material.

5. The process of claim 4, wherein said emulsion is heated to a temperature within the range of from 140° F. to 185° F.; and said unreacted materials are removed from said emulsion at a pressure between 0.1 and 1 atmosphere.

6. An improved process for preparing a resin and latex comprising charging water, a first portion of an emulsifying agent which is active in an acid medium, a polymerization catalyst, a mono-olefinic organic material, and sulfur dioxide in an amount stoichiometrically in excess of said mono-olefinic organic material, to a first reaction zone; dissolving said sulfur dioxide in said water; emulsifying said mono-olefinic organic material in said aqueous solution of sulfur dioxide to form an oil-in-water emulsion; reacting at least equimolar quantities of said mono-olefinic organic material and said sulfur dioxide to form a heteropolymer; passing said heteropolymer containing emulsion from said first reaction zone through a heat exchange zone wherein said heteropolymer containing emulsion is heated to a temperature between 140° F. and 185° F.; passing said heteropolymer containing emulsion into a coagulation zone wherein unreacted materials are removed from said emulsion at a pressure of from 0.1 to 1 atmosphere; passing said unreacted materials into a body of water in a second reaction zone, wherein unreacted sulfur dioxide is dissolved in said water and water insoluble materials are separated therefrom; removing said water insoluble gaseous materials from said second reaction zone; passing a coagulant into said coagulation zone and dispersing said coagulant in said emulsion; whereby the structure of said emulsion is broken down; recovering resulting resin from said coagulation zone; passing a second portion of said emulsifying agent, a polymerization catalyst, a mono-olefinic organic material, and additional sulfur dioxide to said second reaction zone, the amount of said sulfur dioxide therein being at least equimolar with said mono-olefinic organic material; and repeating the steps of reaction and recovery recited in connection with the materials charged to said first reaction zone.

7. An improved process for preparing a resin which comprises emulsifying a mono-olefinic organic material in an aqueous solution of sulfur dioxide, said sulfur dioxide being in an amount in excess of a mol ratio of 1:1 with said mono-olefin; effecting a reaction between said sulfur dioxide and said mono-olefinic organic compound to produce a heteropolymeric reaction product; removing unreacted materials from said emulsion, recovering a resulting resin from said emulsion and passing said unreacted materials into water, whereby unreacted sulfur dioxide is dissolved in said water and is separated from water insoluble materials; emulsifying said resulting sulfur dioxide solution with additional mono-olefinic organic material in such an amount that said sulfur dioxide is at least equimolar with said mono-olefinic organic material; and reacting said sulfur dioxide with said additional mono-olefinic organic material.

8. An improved process for recovery of purified unreacted sulfur dioxide from a process for the production of heteropolymers by reacting a stoichiometrically excessive amount of sulfur dioxide with a mono-olefinic organic material reactable with sulfur dioxide in an aqueous emulsion, which comprises the steps of separating unreacted materials from said heteropolymers; and passing said unreacted materials through a water bath, whereby said sulfur dioxide is dissolved in said water and is separated from any water insoluble unreacted material.

9. An improved process for recovery of purified unreacted sulfur dioxide from a process for the production of heteropolymers by reacting in an aqueous medium a stoichiometrically excessive amount of sulfur dioxide with an unsaturated organic material in which the unsaturation is between two adjacent carbon atoms and which will interact with sufur dioxide to form a resin, which comprises the steps of separating unreacted materials from said heteropolymers; and passing said unreacted materials through a water bath whereby sulfur dioxide is dissolved in said water and is separated from any water insoluble unreacted material.

10. An improved process for preparing a resin which comprises emulsifying an unsaturated organic material in which the unsaturation is between two adjacent carbon atoms and which will interact with sulfur dioxide to form a resin in an aqueous solution of sulfur dioxide, said sulfur dioxide being in an amount in excess of a mol ratio of 1:1 with said unsaturated organic material; effecting a reaction between said sulfur dioxide and said unsaturated organic material to produce a heteropolymeric reaction product; removing unreacted materials from said emulsion, recovering a resulting resin from said emulsion and passing said unreacted materials into water, whereby unreacted sulfur dioxide is dissolved in said water and is separated from water insoluble materials; emulsify said resulting sulfur-dioxide solution with additional said unsaturated organic material in such an amount that said sulfur dioxide is at least equimolar with said unsaturated organic material and reacting said sulfur dioxide with said additional unsaturated organic material.

WILLIE W. CROUCH.

REFERENCES CITED

The following references are of record in the file of this patent:

UNITED STATES PATENTS

| Number | Name | Date |
|---|---|---|
| 2,371,719 | Starkweather | Mar. 20, 1945 |
| 2,453,039 | Schribner et al. | Nov. 2, 1948 |
| 2,462,013 | Waterman | Feb. 15, 1949 |